W. ATKINS.
PLOW ATTACHMENT FOR MOTOR TRACTORS.
APPLICATION FILED APR. 26, 1916.
1,314,038.
Patented Aug. 26, 1919.
4 SHEETS—SHEET 1.
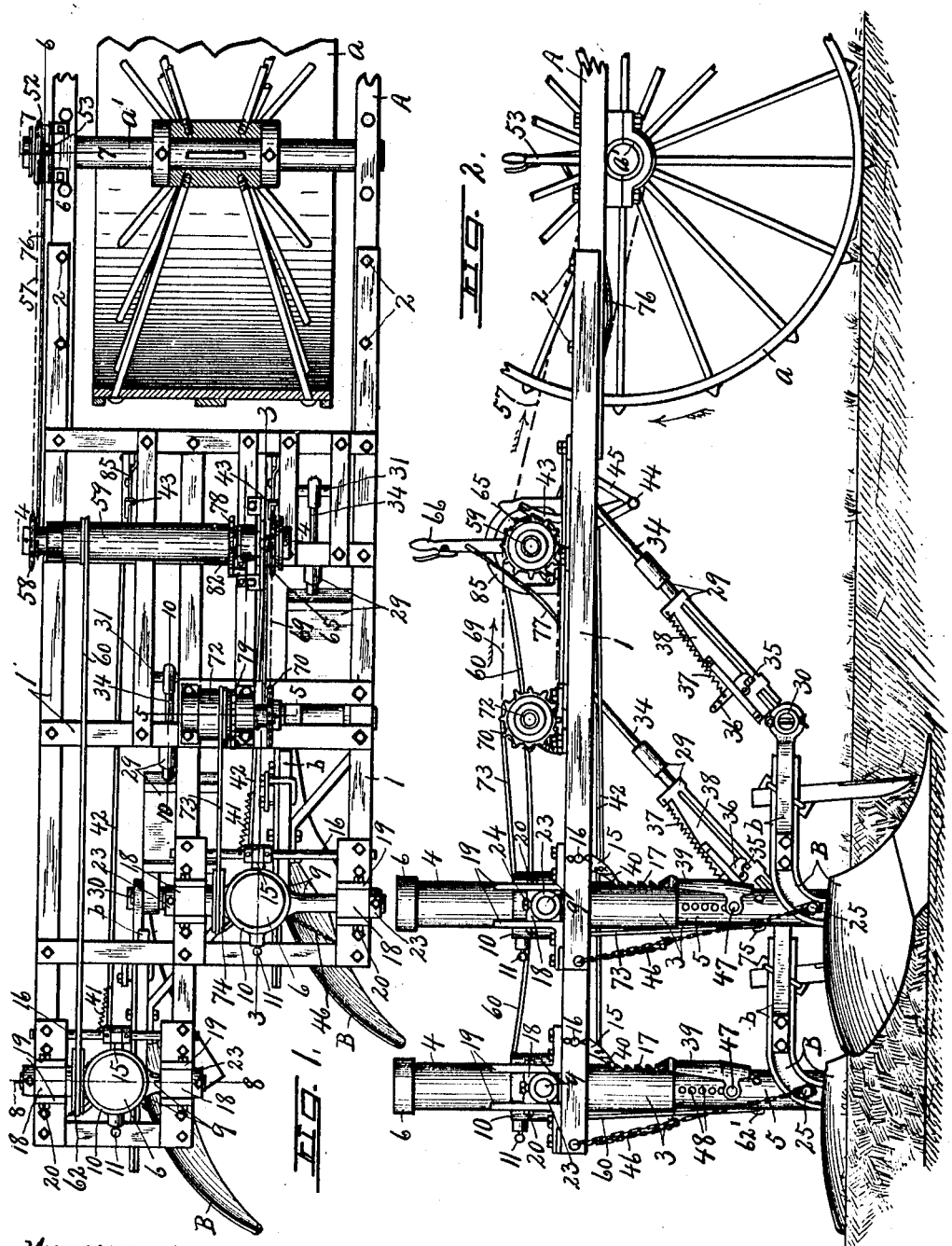

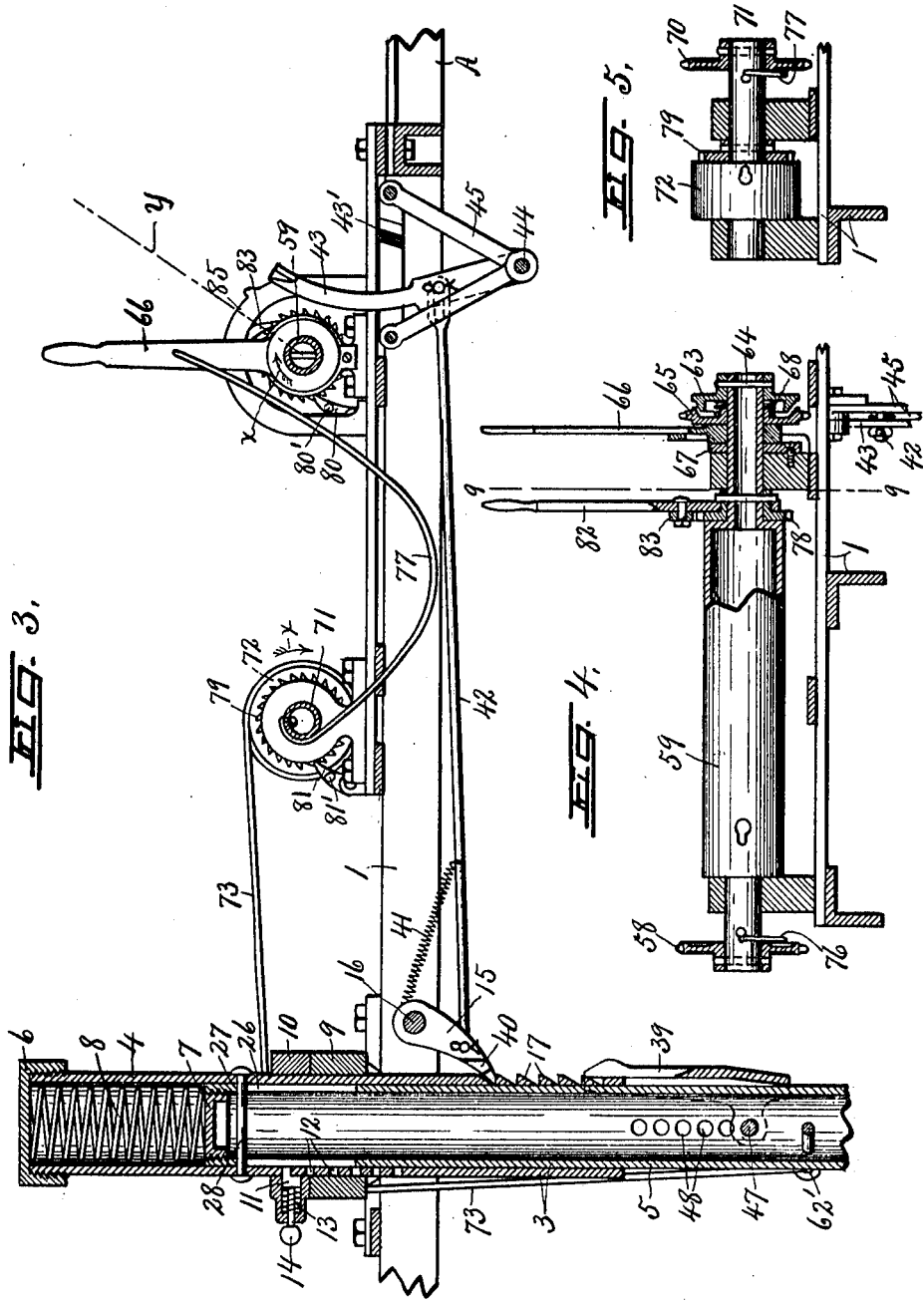

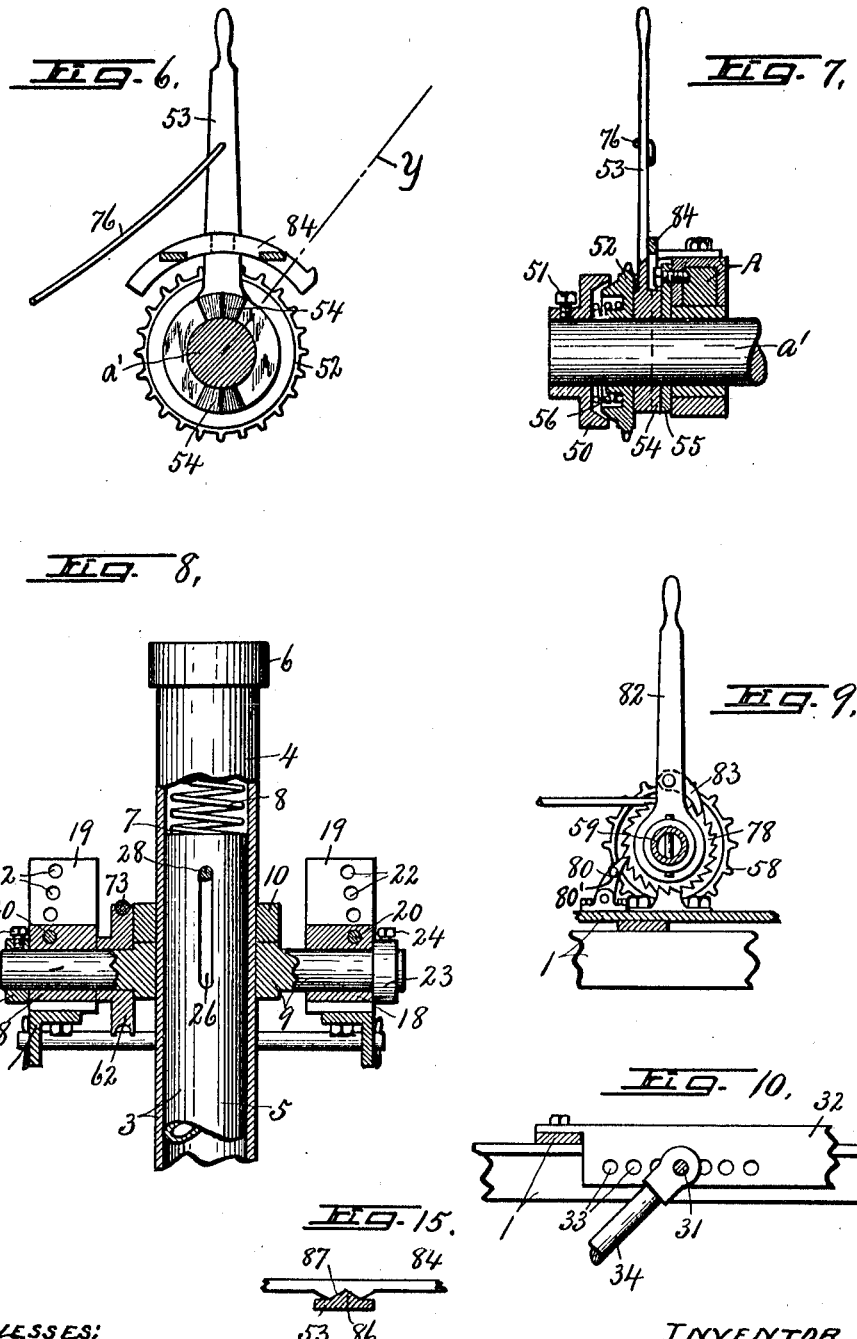

W. ATKINS.
PLOW ATTACHMENT FOR MOTOR TRACTORS.
APPLICATION FILED APR. 26, 1916.
1,314,038.
Patented Aug. 26, 1919.
4 SHEETS—SHEET 4.
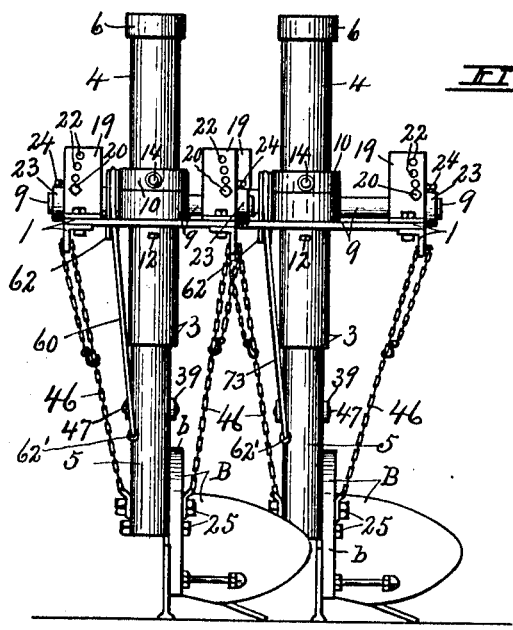
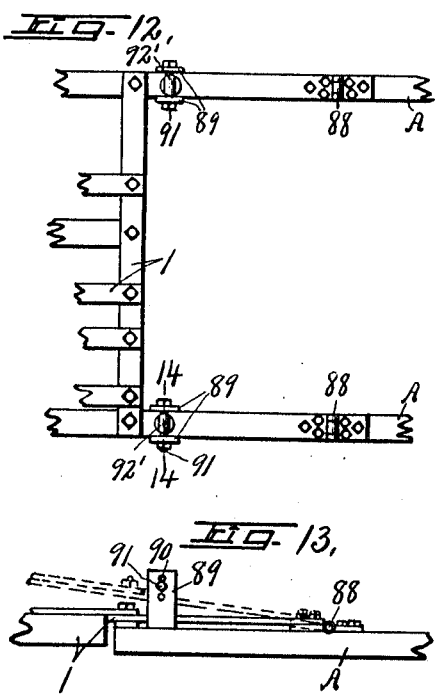
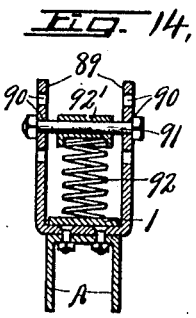
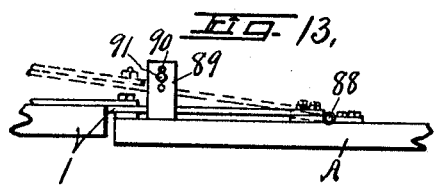

UNITED STATES PATENT OFFICE.

WILLIAM ATKINS, OF AUBURN, NEW YORK.

PLOW ATTACHMENT FOR MOTOR-TRACTORS.

1,314,038.  Specification of Letters Patent.  Patented Aug. 26, 1919.

Application filed April 26, 1916. Serial No. 93,649.

*To all whom it may concern:*

Be it known that I, WILLIAM ATKINS, a citizen of the United States of America, and resident of Auburn, in the county of Cayuga, in the State of New York, have invented new and useful Improvements in Plow Attachments for Motor-Tractors, of which the following, taken in connection with the accompanying drawings, is a full, clear, and exact description.

This invention relates to a plow attachment for motor tractors or other wheel trucks, the main object being to provide such an attachment which may be made up and sold as a unitary article of manufacture and attached or applied to the frame of any tractor or truck. In other words, I have sought to provide an auxiliary frame capable of being mounted upon and supported entirely by the tractor frame as a trailer therefor and of carrying one or more vertically adjustable plow-supports.

Another object is to provide each plow-support with a vertically movable plow-supporting section spring-pressed downwardly so as to hold the plow in the ground under yielding pressure.

A further object is to provide each plow with a draft device flexibly connected to the plow beam and to the auxiliary frame to allow vertical adjustment of the corresponding plow-support without disconnecting the other parts.

A still further object is to provide means whereby either plow and its vertically movable supporting section may be adjusted vertically to regulate the depth of the furrow or to clear the surface of the ground while the machine is in transit to and from the place of plowing.

Other objects and uses relating to specific parts of the plow attachment will be brought out in the following description.

In the drawings—

Figure 1 is a top plan of a gang plow attachment shown as operatively mounted upon the rear end of a motor tractor frame, the tractor wheel being shown in section.

Fig. 2 is a side elevation of the apparatus shown in Fig. 1.

Fig. 3 is an enlarged longitudinal vertical sectional view taken on line 3—3, Fig. 1.

Figs. 4 and 5 are transverse vertical sectional views taken, respectively, on lines 4—4, and 5—5, Fig. 1, the drum in Fig. 5 and a portion of the drum in Fig. 4 being shown in elevation.

Figs. 6 and 7 are enlarged vertical sectional views taken, respectively, on lines 6—6, and 7—7, Fig. 1.

Fig. 8 is an enlarged vertical sectional view taken on line 8—8, Fig. 1, the lower portion of the upright plow-support being broken away and the upper portion thereof shown in elevation.

Fig. 9 is a transverse vertical sectional view taken in the plane of line 9—9, Fig. 4.

Fig. 10 is a longitudinal sectional view taken on line 10—10, Fig. 1.

Fig. 11 is a rear end elevation of the plow attachment shown in Figs. 1 and 2.

Figs. 12 and 13 are, respectively, a top plan and a side elevation of the rear end of the tractor frame and front end of the auxiliary frame showing a hinge connection between said frames to permit the auxiliary frame to rock vertically relatively to the tractor frame.

Fig. 14 is an enlarged transverse sectional view taken on line 14—14, Fig. 12.

Fig. 15 is a cross sectional view of one of the clutch levers and top plan of the adjacent rack about which it is movable showing the means for locking such lever in position for setting the clutch.

As illustrated more clearly in Figs. 1 and 2, the auxiliary frame or trailer —1— is rigidly secured by bolts —2— to the rear end of a motor tractor frame —A— directly at the rear of and in line with the traction wheel, as —*a*—, which latter is journaled in suitable bearings on the tractor frame —A—.

A plurality of, in this instance two, upright plow-supports —3— are mounted upon the rear end of the trailer frame —1— in different longitudinal vertical planes side by side, and also in different transverse vertical planes one in advance of the other, the foremost plow being disposed at the mold-board side of the next succeeding plow so that the furrows may be turned in sequence.

Each plow-support preferably consists of upper and lower upright tubular sections —4— and —5— telescoping one within the other and closed at the top by caps —6— and —7— forming abutments for the ends of a coil spring —8— which is located in the upper end of the tubular section —4— to force the inner lower section carrying the plow downwardly under a yielding pressure.

Each tubular section —4— is adjustable vertically in a supporting yoke —9— and is held in its adjusted position against downward movement by a collar —10—, resting upon the upper face of the yoke —9— and adjustably mounted on said section, and held in its adjusted position by locking bolt —11— which is movable radially in an opening in one side of the collar into and out of any one of a series of apertures —12— in the section —4— and is spring-pressed inwardly to its locking position by a spring —13—, said locking bolt having an external hand-piece —14— by which it may be withdrawn from its locking position against the action of the retracting spring —13— when it is desired to adjust the section —4— to regulate the depth of the furrow.

Suitable means is provided, however, for positively locking the section —4— against upward movement, said means consisting, in this instance, of a detent or pawl —15— pivoted at —16— to the frame —1— and having its free end adapted to engage any one of a series of teeth —17— on the front side of the section —4—, as shown more clearly in Fig. 3.

The yoke —9— constitutes a transverse rock shaft having a central opening of just sufficient size to permit the tubular section —4— to slide vertically therein and to hold said section against lateral rocking movement relatively to said shaft, the ends of the shaft being journaled in suitable bearings —18—, either of which is adjustable vertically between upright guide-ways —19—, and are held in their adjusted position by locking pins —20— adapted to enter any one of a series of apertures —22— in the upright ways —19—.

The object of the vertical adjustment of the bearings —18— is to permit the plow-support with the plow thereon to be tilted laterally, preferably outwardly, so as to reduce the resistance of the sod against the mold-board, and thus permit greater speed of movement of the plow through the soil, relying upon the speed to properly turn such soil.

The rock shaft —9— is held against endwise movement by collars —23— which are secured to the outer ends thereof by set screws —24— and bear against the adjacent ends of the journal boxes —18—.

Each of the inner tubular sections —5— carries at its lower end a plow —B— having a beam —b— secured by bolts —25— to the outer side of said section some distance below the lower end of the upper section —4— which extends through an opening in the frame —1— above and below the same.

The inner tubular section —5— of each plow-support extends upwardly into the upper section —4— some distance above the collar —10— and is provided at its upper end with diametrically opposite lengthwise slots —26— terminating at their upper ends just below the cap —7— forming shoulders —27— which normally rest upon a stop pin —28—, the latter being secured in diametrically opposite sides of the upper section —4— and serving to limit the downward movement of the lower section —5— under the action of the spring —8—, while at the same time the slots —26— permit the tubular section —5— with the plow thereon to move vertically against the action of said spring.

A draft device —29— has one end flexibly connected by a hinge —30— to the front end of the plow beam —b— and its other end inclined upwardly and forwardly and pivotally connected by a pin —31— to a plate —32— on the frame —1—, said plate being provided with a longitudinal row of apertures —33—, either of which is adapted to receive the pin —31— for permitting the proper adjustment of the draft device —29— to the frame to compensate for any vertical adjustment of the plow-support for different depths of furrows.

This draft device includes an automatic uncoupler similar to that set forth in my pending application, Serial No. 47,997, filed August 30, 1915, in which a rod —34— pulls directly against a lever —35—, the free end of which is yieldingly held in operative position by another lever —36—, the latter being connected by a spring —37— to a part of the supporting frame —38— for said levers, the frame also serving as a guide for the draw-rod —34—. The detail construction of the automatic uncoupler, however, forms no part of my present invention, since any automatic uncoupler may be used in the same relation.

It is now clear that the plow and its upright support —3— are free to rock forwardly and rearwardly about the axis of the rock shaft —9—, which, together with the guides —19—, serve to hold the plow-support against bodily forward and rearward movement.

Under plowing conditions, the resistance of the soil would tend to rock the plow and its support rearwardly about the axis of the shaft —9—, but this is prevented by the draft device —29— which exerts an upward and forward pull upon the front end of the beam, tending to keep the plow-support in approximately an upright position, but in case the plow points should strike an obstruction, such as a root or large stone, it is free to move upwardly against the action of the spring —8— to override such obstacle, and is also free to rock rearwardly by reason of the flexing joints —30— and pivotal pin —31—, and in case the resistance to the forward movement of the plow were sufficient to overcome the tension of the spring —37— of the automatic uncoupler, the entire plow with the frame —38— attached thereto would be released from the draw-rod —34—, thus permitting the plow to swing rearwardly and upwardly about the axis of the shaft —9— entirely out of the ground in case the obstacle still remains in engagement with the point of the plow, thus allowing the latter to trail over the obstacle without liability of over-straining any of the parts of the machine.

The object, therefore, of the automatic uncoupler and also of the flexing connections between it and the plow, together with the rocking action of the plow-support and yielding vertical movement of the lower plow-supporting section —5—, is to relieve the plow and its connections with the frame from excessive strains in case the plow point should encounter excessive resistance.

Provision is also made for automatically tripping the pawl —15— and permitting the upper tubular section —4— to rise in case the plow and its supporting section —5— should be suddenly forced upwardly to an excessive degree against the action of the spring —8—, and for this purpose I have provided the plow-supporting section —5— with a tripping member —39— pivoted to the front side thereof so as to ride across the points of the teeth —17— as the section —5— with the plow thereon is raised, the upper end of the tripping member —39— being beveled and adapted to ride under a lateral projection —40— on the free end of the pawl or detent —15—, thereby forcing the latter out of engagement with the teeth —17— and permitting the entire plow-support, including the section —4— and collar —10— thereon, to move vertically relatively to the yoke —9—, thus permitting sufficient upward thrust of the plow-support to clear the plow from the ground or any obstacles which it may encounter, the weight of the plow and its support, together with the tendency of the point to draw into the soil, being sufficient to restore the plow to its operative position under normal conditions of the soil.

As the plow-support returns to its normal position, the tripping member —39— will be withdrawn from the pawl —15—, thus permitting the latter to be forced to its operative position by a retracting spring —41—.

The pawl —15— may, however, be tripped at will and for this purpose is connected by a link —42— to a foot lever —43—, the latter being pivoted at —44— to a bracket —45— on the frame —1—, as shown more clearly in Fig. 3, and may be locked in its tripping position by engagement of the lever —43— in a notch —43'—.

If necessary to hold the plows against undue lateral movement, the lower ends of the upright plow-supporting sections —4— and —5— may be connected to the frame —1— by diagonal stay-chains or guys —46— which may also serve to relieve the stop pin —28— from excessive strains, due to the weight and downward pull of the plow when in action.

It will be observed upon reference to Fig. 3 that the tripping member —39— may be adjusted vertically to different positions so as to automatically trip the detent —15— earlier or later in the upward movement of the plow-supporting section —5—, and for this purpose is held in place by a bolt —47— adapted to enter any one of a series of apertures —48— in the section —5—.

When the bolt —15— is tripped in the manner described, the locking bolt —11— may be withdrawn and the entire upright plow-support, consisting of the tubular sections —4— and —5—, may be moved vertically to withdraw the plow from the ground which may be done either by hand or by power from the traction wheel in a manner presently described.

When the plows are to be raised by power, the axle or shaft —a'— of the traction wheel —a— is extended beyond one side of its supporting frame —A— and provided with a friction clutch section —50— secured thereto by a set screw —51— to coöperate with a companion clutch section —52— which is loosely mounted on the shaft —a'— and is adapted to be forced into frictional engagement with the section —50— by means of a lever —53— also loosely mounted on the shaft and provided with suitable cam faces —54— coöperating with similar cam faces on a relatively stationary member —55— on the adjacent side of the frame —A—, the clutch section —52— being returned to its normal position by a retracting spring —56—.

This clutch section —52— is provided with sprocket teeth connected by a chain —57— to another sprocket —58— which is secured to one end of a drum —59—, shown more clearly in Figs. 1 and 4.

This drum —59— is journaled in suitable bearings on the trailer frame —1— and to which is attached one end of a cable —60— which passes over an idler —62— on the yoke or rock shaft —9— of the rearmost plow-support —3— and is attached at —62'— to the lower section —5— of the rearmost plow-support —3—.

As shown in Fig. 4, the opposite end of the drum —59— is provided with a friction clutch section —63— secured thereto by a pin —64— and adapted to be engaged by a companion clutch section —65— which is loosely mounted on the adjacent end of the same drum and adapted to be forced into frictional engagement with the section —63— by means of a lever —66— coöperating with a cam plate —67— similar to that previously described on the traction wheel shaft —a'—, shown more clearly in Fig. 7, the clutch section —65— being automatically released from engagement with the section —63— by means of a retracting spring —68—.

The clutch section —65— is provided with sprocket teeth connected by chain —69— to another sprocket wheel —70— on a second counter-shaft —71— which is journaled in suitable bearings on the trailer frame —1—, as shown more clearly in Fig. 5, and is provided with a drum —72— to which is attached one end of a cable —73— having its other end passed over a sheave —74— and connected at —75— to the vertically movable section —5— of the foremost plow-support —3—.

As shown in Fig. 2, the cable —60— connecting the drum —59— to the rearmost plow-support is normally slack, while the other cable —73— connecting the drum —72— to the foremost plow-support is normally taut, the sag or slackness in the cable —60— being sufficient to allow the foremost plow to be raised before the rearmost plow begins to rise, thereby allowing the latter to plow its furrow to the point of ending of the furrow made by the foremost plow.

It is now clear that when it is desired to raise the plows by power through the medium of the traction wheel, the lever —66— may be first operated to engage the clutch section —55— with its companion —63—, after which the lever —53— on the axle of the traction wheel may be operated to throw its corresponding clutch into action, thereby transmitting motion through the medium of the sprocket chains —67— and —69— to both of the drums —59— and —72— in the direction indicated by arrows —X—, Fig. 3, and causing the cables —60— and —73— to be wound upon said drums for raising their corresponding plow-supports with the plows thereon in the order previously described while the machine is in action.

Suitable provision is made for automatically releasing both clutches as soon as the plows are elevated clear from the ground; and for this purpose I have provided two normally slack cables —76— and —77—, one of which, as the cable —76—, is attached at one end to the drum —59— and has its other end attached to the lever —53—. The cable —77— has one end attached to the drum —72— and its other end attached to the lever —66—, said cables —76— and —77— being of such length and connected in such manner that they will wind upon their respective drums and tighten to trip their corresponding levers for releasing their respective clutches at about the same time that the plows are elevated from the ground.

The drums —59— and —72— are provided with ratchet wheels —78— and —79—, respectively engaged by holding pawls or detents —80— and —81— for holding their respective drums against retro-active movement under the tension of their respective cables —60— and —73— carrying the weights of their respective plows when the latter are elevated in the manner just previously described.

If the plows are to be elevated by hand from their operative positions, the lever —53— and its clutch section —52— on the traction wheel shaft —a'— may be left in their normal released positions, while the lever —66— and its corresponding clutch section —65— may be thrown to their operative positions for transmitting rotary motion from the drum —59— to the drum —72—, and under these conditions a separate lever —82— is loosely mounted upon the hub of the ratchet wheel —78—, and is provided with a pawl —83— for engagement with ratchet teeth and rotating the drum —59— in the same direction and for the same purpose as when driven by the motive power in the manner previously described.

The clutch levers —53— and —66— are movable about relatively stationary racks —84— and —85— and are provided with V-shape cams —86— adapted to enter corresponding recesses —87— in their respective racks to frictionally lock said levers in their adjusted positions for setting the corresponding clutches, the engaging portions of the lever —43— and its notch —43'— being of similar construction, it being understood that all of said levers are arranged so as to spring automatically into their respective notches or recesses when registering therewith.

In Figs. 12 and 13, the plow-supporting frame or trailer —1— is shown as hinged at —88— to the tractor frame —A— some distance in front of the rear ends of said tractor frame so that the forward ends of the trailer frame —1— will normally rest on the rear ends of the tractor frame, the opposite arms on the front end of the trailer frame being guided in their vertical movement between separate pairs of upwardly projecting ears —89— which are secured to the tractor frame, as shown more clearly in Fig. 14.

These upwardly projecting ears or guides —89— are provided with bolt openings —90— for the reception of a bolt —91— carrying an abutment —92'— between which and the forwardly projecting arms of the trailer frame —1— are supported coil springs —92— for forcing the trailer frame downwardly under yielding pressure, the object of the series of bolt openings —90— being to permit the adjustment of the tension of the springs —92—.

After the plows have been raised above the ground in the manner previously described and it is desired to lower them, it is simply necessary to withdraw the pawls —80— and —81— which are provided with laterally projecting handles —80'— and —81'— for this purpose, although it is evident that the pawls may be kicked from their holding position by the engagement of the foot of the operator with the projections —80'— and —81'— if desired.

The operation of the device may be briefly described as follows, assuming that both plows are elevated above the surface of the ground and that the machine is propelled to the place of beginning of plowing, under which conditions the cables —57— and —60— and —69— and —77— will all be under tension with the clutch levers —53— and —66— in their released positions, as shown by dotted lines —y—, Figs. 3 and 6 and the pawls —80— and —81— in their holding positions, the weight of the plows and their supports being borne directly by their corresponding cables —60— and —73— which are held against unwinding from their respective drums by their corresponding pawls —80— and —81—.

Then, the pawls —80 and —81— are withdrawn in sequence from their holding positions by the operator to allow both plows to descend in reverse order from that in which they are raised,—that is, the foremost plow descends first and it is immediately followed by the lowering of the rearmost plow so that the latter may begin its plowing at about the same transverse line as that of the foremost plow, the weight of the plows, together with the tendency of the points to draw under the soil, serving to depress them to the limit of their downward movement, as determined by the engagement of the collars —10— with the yoke —9—, in which position the upper tubular sections —4— of both plow-supports would be automatically locked by their respective pawls —15—, while the springs —8— will force the plow-carrying sections —5— downwardly under yielding pressure until limited by the stop pins —28—.

The plowing then continues until it is necessary to again raise the plows from the ground which may be accomplished by power from the traction wheels or by hand through the proper operation of the clutch levers —53— and —66— in the manner previously described.

One of the specific advantages in the use of the springs —8— in yieldingly holding the plow-supporting sections —5— downwardly is to permit said plows to move vertically against the action of said springs in case the tractor should enter depressions in the line of travel, thereby maintaining approximately uniform depth of furrow, even though the surface of the soil over which the tractor is passing may be more or less uneven.

What I claim is:

1. A plow attachment for a tractor comprising a tractor frame, an upright plow support mounted upon said frame and adjustable vertically relatively thereto, means for locking said support in its adjusted position, said support having a vertically movable section spring-pressed downwardly and a stop for limiting the downward movement of said section, and a plow mounted on the vertically movable section.

2. In combination with a truck frame, an upright plow-support adjustably mounted thereon for relative vertical movement, guides for the support, a detent for locking the support against upward movement, said support having a relatively movable section spring-pressed downwardly, a plow carried by said section, and means on the section and movable therewith for tripping the detent in case the upward movement of the section with the plow thereon is excessive.

3. In a plow attachment for tractors, the combination of a frame, a plow support composed of sections, one of which is adjustable vertically on the frame, the other section being movable vertically relatively to the first named section and spring-pressed downwardly, the plow being mounted in the last named section, and means for locking the first named section against vertical movement.

4. In a plow attachment for tractors, the combination of a frame, a plow support composed of sections, one of which is adjustable vertically on the frame, the other section being movable vertically relatively to the first named section and spring-pressed downwardly, the plow being mounted in the last named section, means for locking the first named section against vertical movement, and means on the last named section for tripping the locking means when raised to a predetermined height and allowing both sections to raise to a greater height.

5. In a plow attachment for tractors, the combination of a frame, a plow support mounted on the frame for vertical movement, a plow mounted on the support and having a forwardly projecting beam, and a draft device having one end pivotally connected to the plow beam and its other end adjustably connected to the frame to compensate for vertical adjustment of the plow support, 6. In a plow attachment for tractors, the combination of a frame, a plow support pivotally mounted on the frame for forward and rearward swinging movement and having an independent vertical movement, a plow mounted on the support and having a forwardly projecting beam, and a draft device having one end pivotally connected to the plow beam and its other end pivotally connected to the frame and adjustable forwardly and rearwardly thereon.

7. In a plow attachment for tractors, the combination of a frame, a plow support pivotally mounted on the frame for forward and rearward swinging movement and having an independent vertical movement, a plow mounted on the support, and having a forwardly projecting beam, and a draft device adjustably connecting the plow beam and frame to regulate the depth of furrow.

8. In a plow attachment for tractors, the combination of a frame, a yoke journaled on the frame to swing forwardly and rearwardly, a sectional plow support having one section adjustable vertically of and upon the yoke, and another section movable vertically on the first named section and carrying a plow, and means for holding the second named section in its adjusted position against downward movement and permitting its upward movement.

9. In a plow attachment for tractors, the combination of a frame, a yoke on the frame, a plow support composed of upper and lower upright sections relatively movable vertically one upon the other, the upper section being mounted on the yoke and the lower section carried by the upper section, and a plow mounted upon the lower section.

10. In a plow attachment for tractors, the combination of a frame, a rocking yoke journaled thereon, a plow support composed of upper and lower upright sections relatively movable vertically one upon the other, the upper section being carried by the yoke and the lower section carried by the upper section, a plow mounted upon the lower section, said upper section being adjustable vertically relatively to the yoke, and means for holding the upper section in its adjusted position against downward movement.

11. In a plow attachment for tractors, the combination of a frame, a yoke on the frame, a plow support composed of upright sections one of which is slidable vertically on the yoke and the other section slidable on the first named section, a detent normally holding the first named section against upward movement and means actuated by the second named section when raised beyond a certain limit for tripping the detent.

12. In a plow attachment for tractors, the combination of a frame, a rocking yoke journaled thereon, a plow support composed of upper and lower upright sections movable vertically one in relation to the other, the upper section being mounted on the yoke and the lower section movable vertically relatively thereto, a detent for holding the upper section against vertical movement relatively to the yoke, a plow mounted on the lower section, and means on said lower section for tripping the detent as said lower section with the plow thereon is raised to a predetermined position.

13. In a plow attachment for tractors, the combination of a frame, a yoke mounted on the frame, a plow support composed of upper and lower members, the upper member being mounted on the yoke, said lower member being slidable vertically on the upper member, a plow mounted on the lower member, and means for raising said lower member with the plow thereon independently of the upper member and yoke.

14. In a plow attachment for tractors, the combination of a frame, a rocking yoke journaled thereon, a plow support composed of upper and lower telescoping members, the upper member being mounted on the yoke to turn therewith, said lower member being movable vertically relatively to the upper member against the action of a retracting spring, a plow mounted on the lower member, a rotary drum mounted on the frame, a cable having one end attached to the drum and its other end attached to said lower member, and means for rotating the drum to wind the cable thereon for raising the plow support.

15. In a plow attachment for tractors, the combination of a frame, a rocking yoke journaled thereon, a plow support composed of upper and lower telescoping members, the upper member being mounted on the yoke to turn therewith, said lower member being movable vertically relatively to the upper member against the action of a retracting spring, a plow mounted on the lower member, a rotary drum mounted on the frame, a cable having one end attached to the drum and its other end attached to said lower member, means for rotating the drum to wind the cable thereon for raising the plow support, said means including a clutch and a shifting lever therefor, and connections between said lever and drum whereby the lever is shifted to release the clutch as the plow support is raised to a predetermined position.

16. In a plow attachment for tractors, the combination of a frame, a rocking yoke journaled thereon and provided with a vertical guideway, a plow support composed of an upper tubular section movable in said guideway and a lower tubular section telescoping within the upper section, a spring between the upper ends of said tubular sections operating to move them one in relation to the other, a detent normally holding the upper section against upward movement, a plow mounted on the lower section, and means on said lower section for tripping the detent in case the lower section with the plow thereon should be raised beyond a predetermined position relatively to the upper section.

17. In a plow attachment for tractors, the combination of a frame, a rocking yoke journaled thereon and provided with a vertical guideway, a plow support composed of an upper tubular section movable in said guideway and a lower tubular section telescoping within the upper section, a spring between the upper ends of said tubular sections operating to move them one in relation to the other, a detent normally holding the upper section against upward movement, a plow mounted on the lower section, means on said lower section for tripping the detent in case the lower section with the plow thereon should be raised beyond a predetermined position relatively to the upper section, and driving connections pivotally connected at one end to the frame and at its opposite end to the plow.

In witness whereof I have hereunto set my hand this 15th day of April, 1916.

WILLIAM ATKINS.

Witnesses:
H. E. CHASE,
ALICE M. CANNON.

Copies of this patent may be obtained for five cents each, by addressing the "Commissioner of Patents, Washington, D. C."